(12) United States Patent
Xu et al.

(10) Patent No.: US 10,609,403 B2
(45) Date of Patent: Mar. 31, 2020

(54) METHOD AND APPARATUS FOR BLOCK PARTITION WITH NON-UNIFORM QUAD SPLIT

(71) Applicant: Tencent America LLC, Palo Alto, CA (US)

(72) Inventors: Meng Xu, San Jose, CA (US); Xiang Li, Los Gatos, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/235,937

(22) Filed: Dec. 28, 2018

(65) Prior Publication Data

US 2020/0014946 A1 Jan. 9, 2020

Related U.S. Application Data

(60) Provisional application No. 62/695,390, filed on Jul. 9, 2018.

(51) Int. Cl.
*H04N 19/119* (2014.01)
*H04N 19/44* (2014.01)
(Continued)

(52) U.S. Cl.
CPC .......... *H04N 19/44* (2014.11); *H04N 19/119* (2014.11); *H04N 19/176* (2014.11); *H04N 19/184* (2014.11)

(58) Field of Classification Search
CPC .... H04N 19/44; H04N 19/119; H04N 19/176; H04N 19/184
(Continued)

(56) References Cited

U.S. PATENT DOCUMENTS 8,526,495 B2 9/2013 Liu et al.
9,049,452 B2 6/2015 Liu et al.
(Continued)

OTHER PUBLICATIONS

Ma et al. "Description of Core Experiment: Partitioning", Apr. 2018.*
Fraunhofer, "Quadtree Plus Binary Tree with Shifting", JVET-J0035 Power-Point Slides, Apr. 2018.*
(Continued)

*Primary Examiner* — James T Boylan
(74) *Attorney, Agent, or Firm* — Oblon, McClelland, Maier & Neustadt, L.L.P.

(57) ABSTRACT

A method of video decoding includes acquiring a current picture and signaling information from a coded video bitstream. The method further includes determining, from the signaling information, whether the block is partitioned in accordance with a quad split partition type. The method further includes, in response to determining that the block is not partitioned in accordance with the quad split partition type, determining whether the block is partitioned in accordance with a split partition type. The method further includes in response to determining that the block is partitioned in accordance with the split partition type, determining whether the block is partitioned in accordance with a non-uniform quad split partition type in which the block is partitioned into four sub-blocks along a same direction. The method further includes in response to determining that the block is partitioned in accordance with the non-uniform quad split partition type, reconstructing the block.

18 Claims, 17 Drawing Sheets

(51) Int. Cl.
  *H04N 19/176* (2014.01)
  *H04N 19/184* (2014.01)
(58) Field of Classification Search
  USPC .................................................. 375/240.25
  See application file for complete search history.

(56) References Cited

U.S. PATENT DOCUMENTS

| | | | |
|---|---|---|---|
| 9,769,472 | B2 | 9/2017 | Liu et al. |
| 10,212,444 | B2 | 2/2019 | Li et al. |
| 2017/0272782 | A1* | 9/2017 | Li .......................... H04N 19/96 |
| 2017/0347095 | A1* | 11/2017 | Panusopone ......... H04N 19/119 |
| 2017/0353721 | A1* | 12/2017 | Piao ..................... H04N 19/119 |

OTHER PUBLICATIONS

High Efficiency Video Coding, Rec. ITU-T H.265 v4, Dec. 2016.
Albrecht et al., "Description of SDR, HDR, and 360° video coding technology proposal by Fraunhofer HHI", ISO/IEC JTC1/SC29/WG11 JVET-J0014, Apr. 2018.
Bordes et al., "Description of SDR, HDR and 360° video coding technology proposal by Qualcomm and Technicolor—medium complexity version", ISO/IEC JTC1/SC2/WG11 JVET-J0022, Apr. 2018.
Li et al., "Description of SDR video coding technology proposal by Tencent", ISO/IEC JTC1/SC29/WG11 JVET-J0029, Apr. 2018.
Ma et al., "Description of Core Experiment: Partitioning," ISO/IEC JTC1/SC29/WG11 JVET-J1021, Apr. 2018.
Liu et al., "Rectangular partitioning for Intra prediction in HEVC", Visual Communications and Image Processing (VCIP), IEEE, Jan. 2012.

* cited by examiner

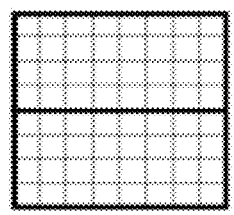
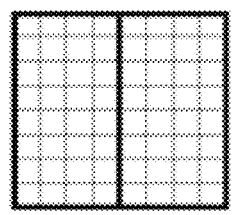
FIG. 9A    FIG. 9B
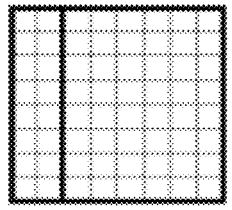
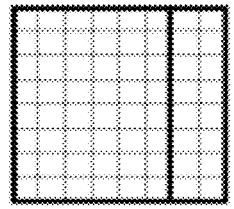
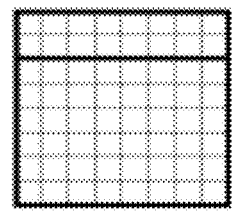
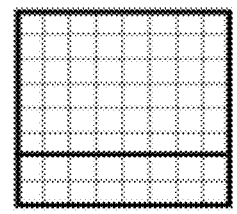
FIG. 9C    FIG. 9D    FIG. 9E    FIG. 9F
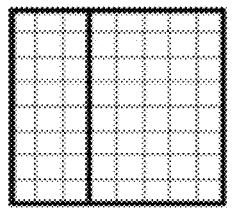
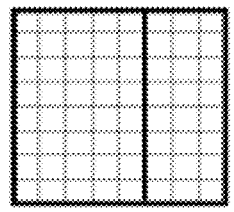
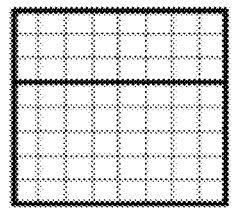
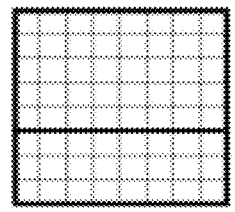
FIG. 9G    FIG. 9H    FIG. 9I    FIG. 9J

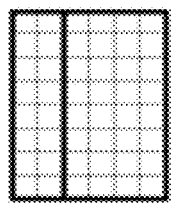 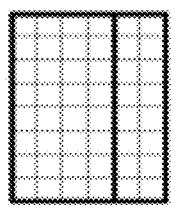 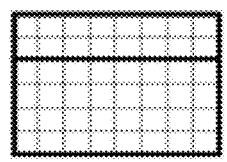 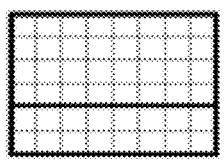
FIG. 10A  FIG. 10B  FIG. 10C  FIG. 10D
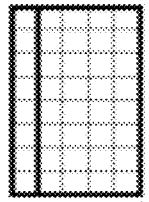 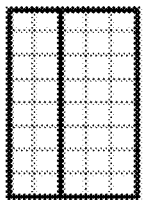 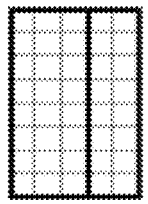 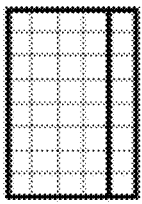
FIG. 10E  FIG. 10F  FIG. 10G  FIG. 10H
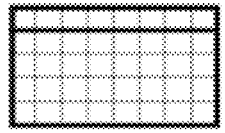 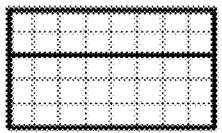 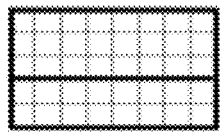 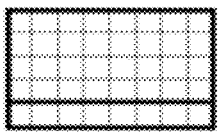
FIG. 10I  FIG. 10J  FIG. 10K  FIG. 10L

METHOD AND APPARATUS FOR BLOCK PARTITION WITH NON-UNIFORM QUAD SPLIT

INCORPORATION BY REFERENCE

This present disclosure claims the benefit of priority to U.S. Provisional Application No. 62/695,390, "BLOCK PARTITION WITH NON-UNIFORM QUAD-SPLIT" filed on Jul. 9, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding using inter-picture prediction with motion compensation has been known for decades. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reduce aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between the original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from neighboring area's MVs. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

A block may be partitioned into smaller units for processing of the block. Current signaling trees for a block partition include partition types such as quad tree (QT), binary tree (BT), and ternary tree (TT). However, these partition types may limit coding performance. Accordingly, the inability to accommodate other partition types is significantly disadvantageous.

SUMMARY

According to an exemplary embodiment, a method of video decoding for a decoder includes acquiring a current picture from a coded video bitstream. The method further includes retrieving signaling information from the coded video bitstream for a block in the current picture. The method further includes determining, from the signaling information, whether the block is partitioned in accordance with a quad split partition type. The method further includes in response to determining that the block is not partitioned in accordance with the quad split partition type, determining whether the block is partitioned in accordance with a split partition type. The method further includes in response to determining that the block is partitioned in accordance with the split partition type, determining whether the block is partitioned in accordance with a non-uniform quad split partition type in which the block is partitioned into four sub-blocks along a same direction. The method further includes in response to determining that the block is partitioned in accordance with the non-uniform quad split partition type, reconstructing the block in accordance with the non-uniform quad split partition type.

According to an exemplary embodiment, a video decoder for video decoding, includes processing circuitry configured to acquire a current picture from a coded video bitstream.

The processing circuitry is further configured to retrieve signaling information from the coded video bitstream for a block in the current picture. The processing circuitry is further configured to determine, from the signaling information, whether the block is partitioned in accordance with a quad split partition type. The processing circuitry is further configured to, in response to the determination that the block is not partitioned in accordance with the quad split partition type, determine whether the block is partitioned in accordance with a split partition type. The processing circuitry is further configured to, in response to the determination that the block is partitioned in accordance with the split partition type, determine whether the block is partitioned in accordance with a non-uniform quad split partition type in which the block is partitioned into four sub-blocks along a same direction, and in response to the determination that the block is partitioned in accordance with the non-uniform quad split partition type, reconstruct the block in accordance with the non-uniform quad split partition type.

According to an exemplary embodiment, a non-transitory computer readable medium having instructions stored therein, which when executed by a processor in a decoder causes the decoder to execute a method that includes acquiring a current picture from a coded video bitstream. The method further includes retrieving signaling information from the coded video bitstream for a block in the current picture. The method further includes determining, from the signaling information, whether the block is partitioned in accordance with a quad split partition type. The method further includes, in response to determining that the block is not partitioned in accordance with the quad split partition type, determining whether the block is partitioned in accordance with a split partition type. The method further includes, in response to determining that the block is partitioned in accordance with the split partition type, determining whether the block is partitioned in accordance with a non-uniform quad split partition type in which the block is partitioned into four sub-blocks along a same direction. The method further includes, in response to determining that the block is partitioned in accordance with the non-uniform quad split partition type, reconstructing the block in accordance with the non-uniform quad split partition type.

BRIEF DESCRIPTION OF THE DRAWINGS

Further features, the nature, and various advantages of the disclosed subject matter will be more apparent from the following detailed description and the accompanying drawings in which:

FIGS. 9A-9J illustrate partition types for block sizes that represent integer powers of 2.

FIGS. 10A-10L illustrate partition types for block sizes that do not represent integer powers of 2.

DETAILED DESCRIPTION OF EMBODIMENTS

Figure 1:
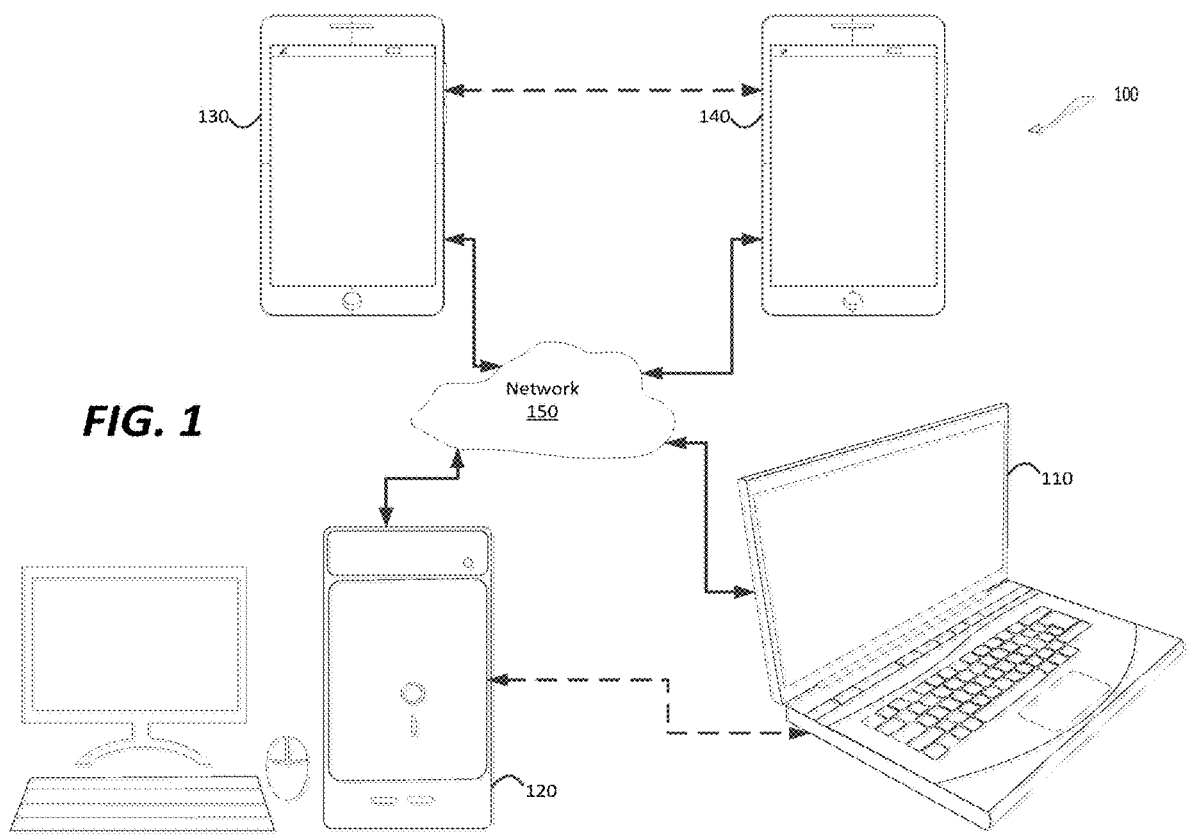
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
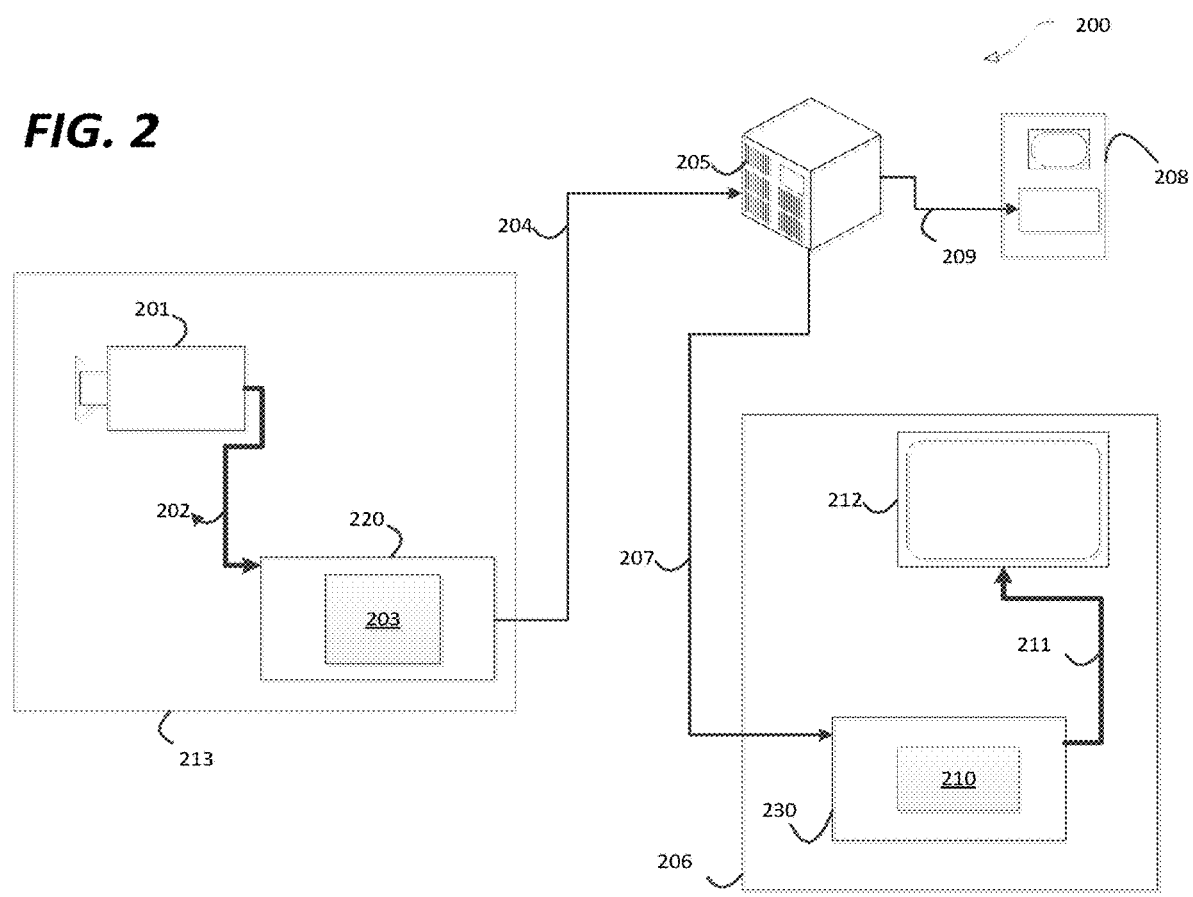
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding or VVC. The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
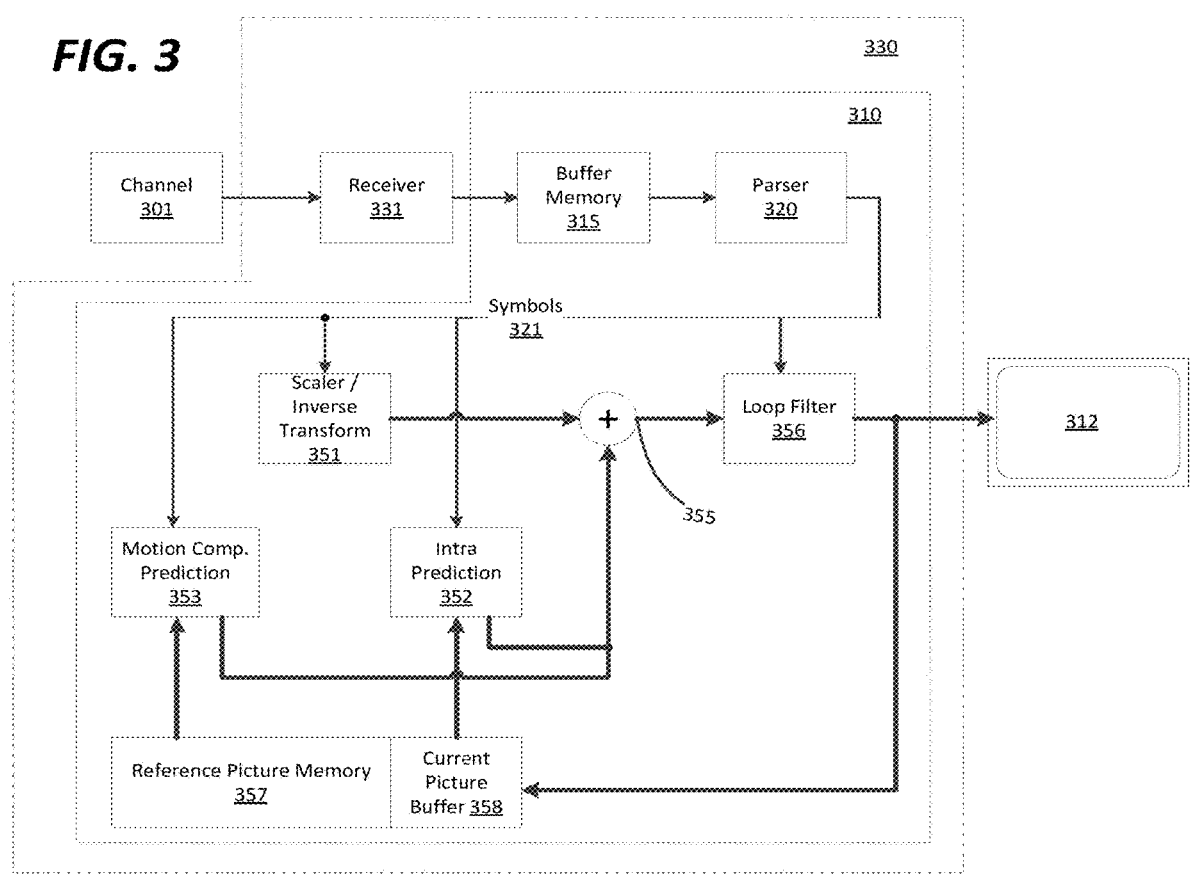
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplementary Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as document in the video compression technology or standard. Specifically, a profile can select a certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
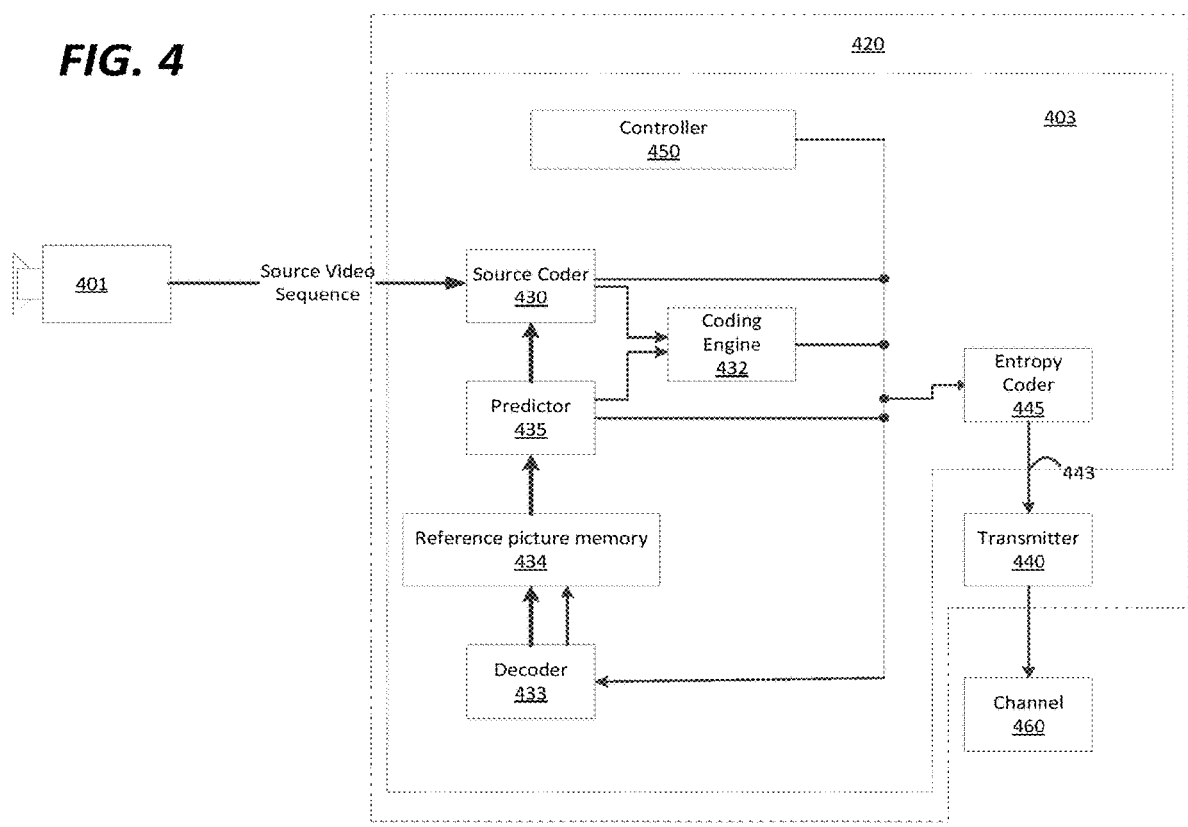
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401)(that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focusses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of Intra pictures, including, for example Independent Decoder Refresh ("IDR") Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference pictures. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

A video may be captured as a plurality of source pictures (video pictures) in a temporal sequence. Intra-picture prediction (often abbreviated to Intra prediction) makes uses of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTUs) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quad tree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels and the like.

Figure 5:
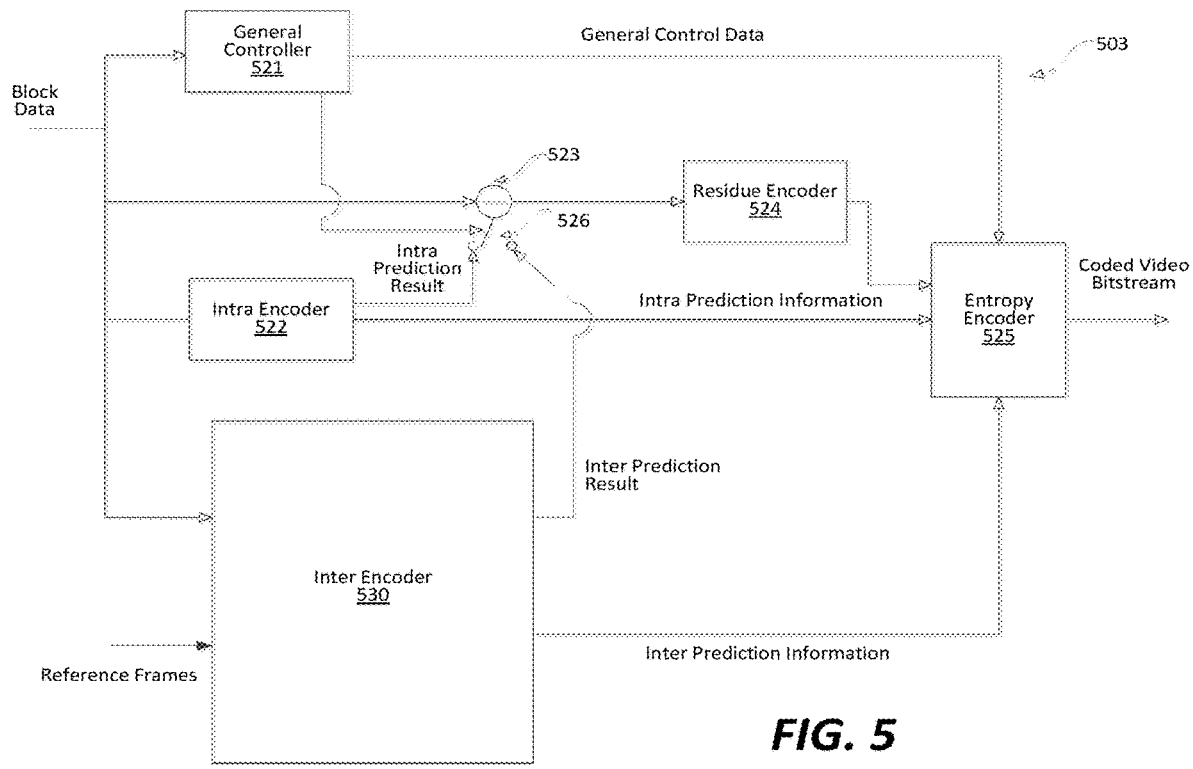
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521) and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique.

The intra encoder (522) is configured to receive the samples of the current block (e.g., a processing block), in some cases compare the block to blocks already coded in the same picture, generate quantized coefficients after transform and, in some cases also intra prediction information (e.g., an intra prediction direction information according to one or more intra encoding techniques).

The general controller (521) is configured to determine general control data and control other components of the video encoder (503) based on the general control data. In an example, the general controller (521) determines the mode of the block, and provides a control signal to the switch (526) based on the mode. For example, when the mode is the intra, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients.

The entropy encoder (525) is configured to format the bitstream to include the encoded block. The entropy encoder (525) is configured to include various information according to a suitable standard, such as HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
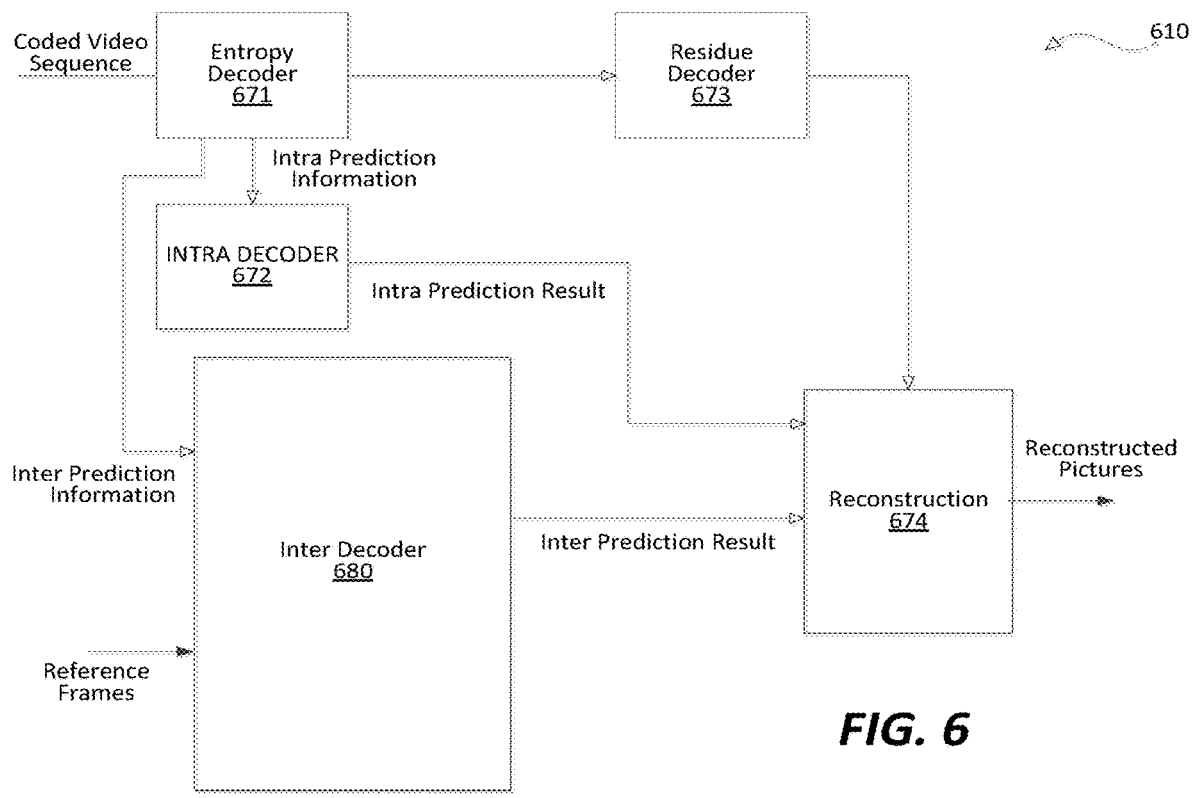
FIG. 6 shows a block diagram of a decoder in accordance with another embodiment.

FIG. 6 shows a diagram of a video decoder (610) according to another embodiment of the disclosure. The video decoder (610) is configured to receive a coded pictures that are part of a coded video sequence, and decode the coded picture to generate a reconstructed picture. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra, inter, b-predicted, the latter two in merge submode or another submode), prediction information (such as, for example, intra prediction information or inter prediction information) that can identify certain sample or metadata that is used for prediction by the intra decoder (672) or the inter decoder (680) respectively residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter QP), and that information may be provided by the entropy decoder (671) (datapath not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403) and (503), and the video decoders (210), (310) and (610) can be implemented using any suitable technique. In an embodiment, the video encoders (203), (403) and (503), and the video decoders (210), (310) and (610) can be implemented using one or more integrated circuits. In another embodiment, the video encoders (203), (403) and (403), and the video decoders (210), (310) and (610) can be implemented using one or more processors that execute software instructions.

According to some embodiments, a CTU is split into CUs by using a quad tree binary tree (QTBT) structure denoted as a coding tree to adapt to various local characteristics of individual blocks included in the CUs. The decision whether to code a picture area using inter-picture (temporal) or intra-picture (spatial) prediction may be performed at the CU level. Each CU may be further split into one, two or four PUs according to a PU splitting type. In some embodiments, inside one PU, the same prediction process is applied and the relevant information is transmitted to the decoder on a PU basis. After obtaining the residual block by applying the prediction process based on the PU splitting type, a CU may be partitioned into TUs according to another quad tree structure similar to the quad tree structure used for the coding tree for the CTU. In some other embodiments, a PU contains only one TU that has the same shape as the PU.

The coding tree for the CTU may include multiple partition types including CU, PU, and TU. In some embodiments, a CU or a TU is only a square shape, while a PU may be square or rectangular shape for an inter predicted block. In other embodiments, rectangular shaped CUs, PUs, and TUs are permitted. At a picture boundary, an implicit quad tree split may be applied so that a block will keep quad tree splitting until the size of the split block fits the picture boundary. According to some embodiments, an implicit split means that a split flag is not signaled but implied instead. For example, implicit QT means only a QT split is allowed for a pictureboundary block. As such, the split flag is not signaled at the picture boundary. As an another example, when only a BT split is allowed at the picture boundary, the implicit split is the binary split. In some embodiments, when both QT and BT are allowed at the picture boundary, there is no implicit split, and the split method is explicitly signaled.

Figure 7A:
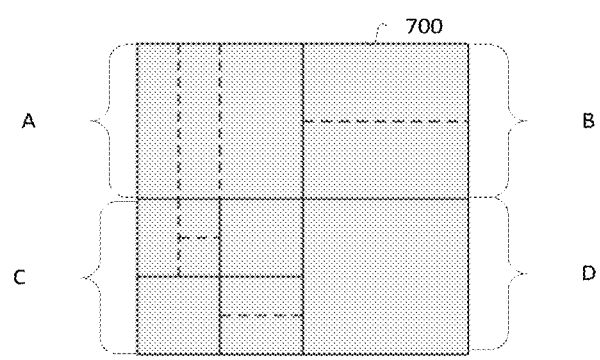
FIGS. 7A and 7B illustrate a quad tree binary tree (QTBT) structure.
Figure 7B:
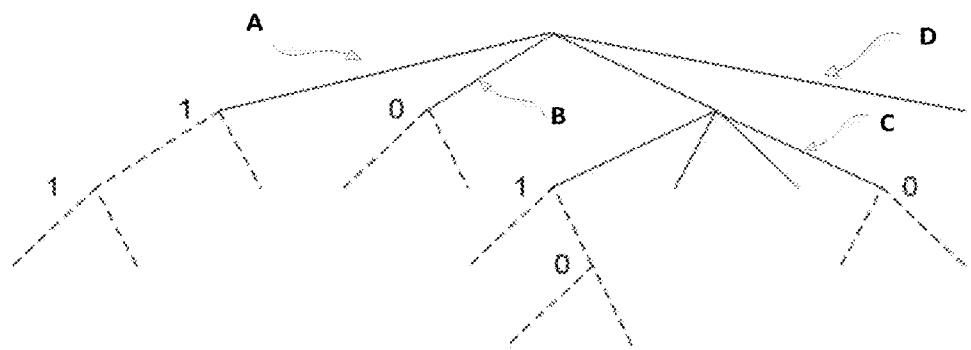

According to some embodiments, the QTBT structure does not include multiple partition types (e.g., QTBT does not include the separation of the CU, PU and TU), and supports more flexibility for CU partition shapes. For example, in the QTBT block structure, a CU may have either a square or rectangular shape. FIG. 7A illustrates an example CTU (700) that is partitioned by the QTBT structure. For example, the CTU (700) is partitioned into four equal sized sub-CUs (A), (B), (C), and (D). FIG. 7B illustrates a corresponding coding tree that illustrates branches corresponding to sub-CUs (A), (B), (C), and (D). The solid lines indicate quad tree splitting, and the dotted lines indicate binary tree splitting. The binary tree structure may include two splitting types: (i) symmetric horizontal splitting and (ii) symmetric vertical splitting. In each splitting (i.e., non-leaf) node of the binary tree, one flag may be signalled to indicate which splitting type (e.g., horizontal or vertical) is used, where 0 indicates horizontal splitting and 1 indicates vertical splitting or vice versa. For the quad tree splitting, the splitting type is not indicated since quad tree splitting splits a block both horizontally and vertically to produce 4 sub-blocks with an equal size.

As illustrated in FIGS. 7A and 7B, the sub-CU (A) is first partitioned into two sub-blocks by a vertical split, where the left sub-block is partitioned again by another vertical split. The sub-CU (B) is further partitioned by a horizontal split. The sub-CU (C) is further partitioned by another quad split partition. The upper left sub-block of sub-CU (C) is partitioned by a vertical split, and subsequently partitioned by a horizontal split. Furthermore, the lower right sub-block of sub-CU (C) is partitioned by a horizontal split. The upper right and lower left sub-blocks of sub-CU (C) are not further partitioned. The sub-CU (D) is not partitioned further and thus, does not include any additional leaf nodes in the coding tree below the "D" branch.

The binary tree leaf nodes may be referred to as CUs, where the binary splitting may be used for prediction and transform processing without any further partitioning, which means that the CU, PU, and TU have the same block size in the QTBT coding block structure. A CU may include coding blocks (CBs) of different colour components. For example, one CU may contain one luma CB and two chroma CBs in the case of P and B slices of a 4:2:0 chroma format, and sometimes contain a CB of a single component (e.g., one CU contains only one luma CB or just two chroma CBs in the case of Intra-pictures or I-slices). In some embodiments, in intra-pictures or I-slices, the TU width or height is constrained to not exceed a given limit (e.g., 64 for luma and 32 for chroma). If the CB width or height is larger than the limit, then the TU is further split until the TU's size does not exceed the limit.

According to some embodiments, the QTBT partitioning scheme includes the following parameters:
  CTU size: the root node size of a quad tree
  MinQTSize: the minimum allowed quad tree leaf node size
  MaxBTSize: the maximum allowed binary tree root node size
  MaxBTDepth: the maximum allowed binary tree depth
  MinBTSize: the minimum allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The QTBT partitioning structure is applied to the CTU first to generate quad tree leaf nodes. The quad tree leaf nodes may have a size from 16×16 (i.e., the MinQTSize) to 128×128 (i.e., the CTU size). If the leaf quad tree node is 128×128, the leaf quad tree node will not be further split by the binary tree since the size exceeds the MaxBTSize (i.e., 64×64). Otherwise, the leaf quad tree node may be further partitioned by the binary tree. Therefore, the quad tree leaf node is also the root node for the binary tree and the quad tree leaf has the binary tree depth as 0. When the binary tree depth reaches the MaxBTDepth (e.g., 4), no further splitting is performed. When the binary tree node has width equal to the MinBTSize (e.g., 4), no further horizontal splitting is performed. Similarly, when the binary tree node has a height equal to MinBTSize, no further vertical splitting is performed. The leaf nodes of the binary tree are further processed by prediction and transform processing without any further partitioning. In some embodiments, the maximum CTU size is 256×256 luma samples.

The QTBT partition structure may further support the ability for the luma and chroma components to each have separate QTBT structures. For example, for P and B slices, the luma and chroma CTBs in one CTU may share the same QTBT structure. However, for I slices, the luma CTB is partitioned into CUs by a QTBT structure, and the chroma CTBs are partitioned into chroma CUs by another QTBT structure. Therefore, in this example, a CU in an I slice contains a coding block of the luma component or coding blocks of two chroma components, and a CU in a P or B slice contains coding blocks of all three colour components.

In some embodiments, inter prediction for small blocks is restricted to reduce the memory access requirements of motion compensation, such that bi-prediction is not supported for 4×8 and 8×4 blocks, and inter prediction is not supported for 4×4 blocks. In other embodiments, the QTBT partition scheme does not include these restrictions.

Figure 8A:
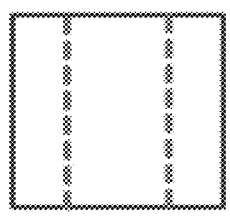
FIGS. 8A and 8B illustrate a ternary tree structure.
Figure 8B:
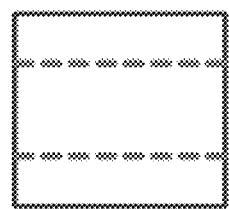

According to some embodiments, a Multi-type-tree (MTT) structure includes (i) quad tree splitting, (ii) binary tree splitting, and (iii) horizontal and vertical center-side ternary trees. FIG. 8A illustrates an embodiment of a vertical center-side ternary tree and FIG. 8B illustrates an example of a horizontal center-side ternary tree. Compared to the QTBT structure, MTT can be a more flexible tree structure since additional structures are permitted.

Ternary tree partitioning includes significantly advantageous features such as providing a complement to quad tree and binary tree partitioning where ternary tree partitioning is able to capture objects which are located in a block center, whereas quad tree and binary tree split along the block center. As another advantage of ternary tree partitioning, the width and height of the partitions of the proposed ternary trees are a power of 2 so that no additional transforms are needed. A two-level tree provides the advantage of complexity reduction. As an example, the complexity of traversing a tree is $T^D$, where T denotes the number of split types, and D is the depth of tree.

According to some embodiments, binary splitting includes shifting of the split. In this regard, the split of a block is performed away from the center of the block such that at least two resulting sub-blocks resulting from the split are not the same size. For example, each block is either not split or is split into two rectangular blocks either in the horizontal or the vertical direction. In some embodiments, both the width and height in the luma samples of the resulting CUs represent integer multiples of 4. As an example, dim represents the width (for vertical splits) or the height (for horizontal splits), in luma samples, of the block to be split. Referring to FIGS. 9A-9J and FIGS. 10A-10L, for both split directions, the following splits may be supported:

(i) ½ split (FIGS. 9A and 9B): This split is supported if dim≥k·8, k∈ℕ..
(ii) ¼ split and ¾ split (FIGS. 9C-9F): These splits are supported if dim represents an integer power of two (dim=$2^n$, n∈ℕ.) and dim≥16.
(iii) ⅜ split and ⅝ split (FIGS. 9G-9J): These splits are supported if dim represents an integer power of two (dim=$2^n$, n∈ℕ.) and dim≥32.
(iv) ⅓ split and ⅔ split (FIGS. 10A-10D): These splits are supported if dim=3·$2^n$, n∈ℕ and dim≥12.
(v) ⅕ split, ⅖ split, ⅗ split and ⅘ split (FIGS. 10E-10L): These splits are supported if dim=5·$2^n$, n∈ℕ and dim≥20.

In some embodiments, an n/m horizontal split specifies a split in which the ratio of the height of the first resulting block (i.e., top block) and the height of the block to be split is equal to n/m. Furthermore, in some embodiments, an n/m vertical split specifies a split in which the ratio of the width of the first resulting block (i.e., left block) and the width of the block to be split is equal to n/m. If the size of the side to be split is not equal to $2^n$, n∈ℕ., then the size of the side to be split is either equal to 3·$2^n$, n∈ℕ. or 5·$2^n$, n∈ℕ..

Figure 11:
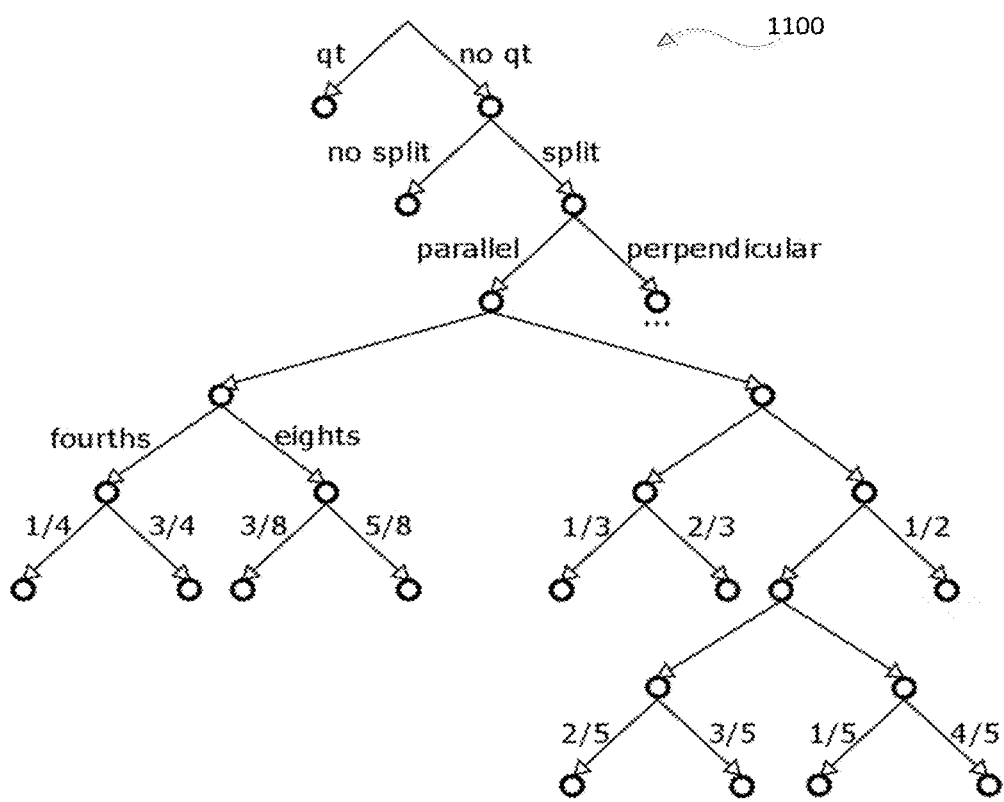
FIG. 11 illustrates an embodiment of a signaling tree.

According to some embodiments, a binary split is uniquely determined by a split direction and split ratio. The direction of the binary splits may be coded depending on the previous split. In this regard, instead of being signaled as a horizontal or a vertical split, the direction of the binary split may be signaled as a perpendicular split or a parallel split which, may be translated to a horizontal or vertical split. In some embodiments, at the root level, when no previous split is signaled, the first perpendicular split is a horizontal split and the first parallel split is a vertical split. A binary flag (e.g., perpend_split_flag) may distinguish between the two possible directions (i.e., perpendicular and parallel). The split ratio may describe the location where to split as illustrated in FIGS. 9A-9J and FIGS. 10A-10L. The type of split for a block may be coded using a binary decision tree. FIG. 11 illustrates an example signaling tree (1100) for a quad tree with binary splits with shifting (QT+BTS) without any restrictions. As illustrated in FIG. 11, both the split direction as well as the split ratio are coded using context-based adaptive arithmetic coding (CABAC). As an example, the counting of the binary tree depth starts with the first split that is not a perpendicular ½ split. The portion of the tree under the "perpendicular" node is not shown since it is the same as the portion of the tree under the "parallel" node.

Figure 12A:
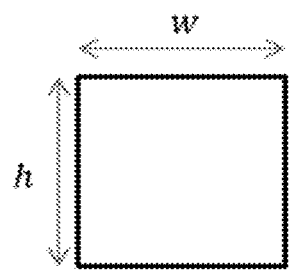
FIGS. 12A-12H illustrate example partition types.
Figure 12B:
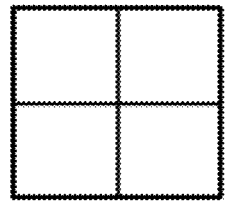
Figure 12C:
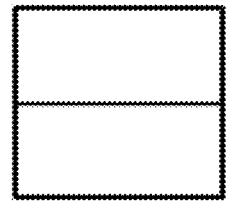
Figure 12D:
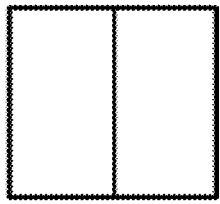
Figure 12E:
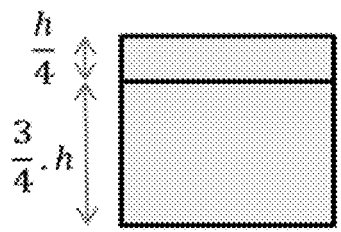
Figure 12F:
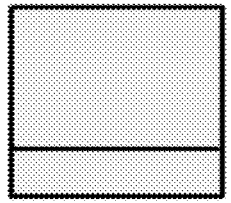
Figure 12G:
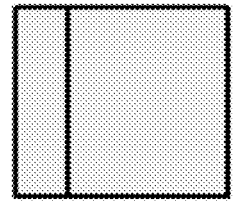
Figure 12H:
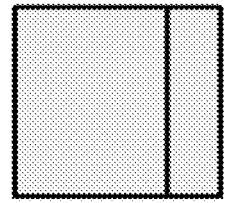

According to some embodiments, a signaling tree may include an asymmetric binary tree (ABT) block partitioning structure. FIGS. 12A-12H illustrate various split partition types. For example, FIG. 12A illustrates a no-split partition type. FIG. 12B illustrates a quad split partition type, where a block is split into four equal sub-blocks along the horizontal and vertical directions. FIGS. 12C and 12D illustrate horizontal and vertical binary split partition types, respectively, where a block is split into two equal sub-blocks along a respective direction. As shown in FIGS. 12E-12H, a block can be partitioned using 1:3 or 3:1 partitions such as HOR_UP (FIG. 12E), HOR_DOWN (FIG. 12F), VER_LEFT (FIG. 12G), and VER_RIGHT (FIG. 12H). For both BTS and ABT, the width or height of a partition may be a non-power-of-2. In some embodiments, a restricted BTS is tested, where a non-power-of-2 partition is allowed, but a non-power-of-2 partition is further split so that the final coding unit has both a width and a height that is a power of 2.

According to some embodiments, at a picture boundary, when a partition of a CTU results in areas that are both inside and outside of the picture boundary, the CTU is further partitioned into smaller coding units. In one embodiment, a CTU at a picture boundary is split recursively using an implicit quad tree, as discussed above. In this embodiment, a split flag is implied and not signaled. In another embodiment, a set of partitions combined with a QT split at the picture boundary is tested, including QT+BT, QT+BT+TT, QT+BT+ABT, QT+BTS. At each split level, when both QT and non-QT splits are both available at the picture boundary, one or more flags may be signaled to indicate which split is applied.

Figure 13A:
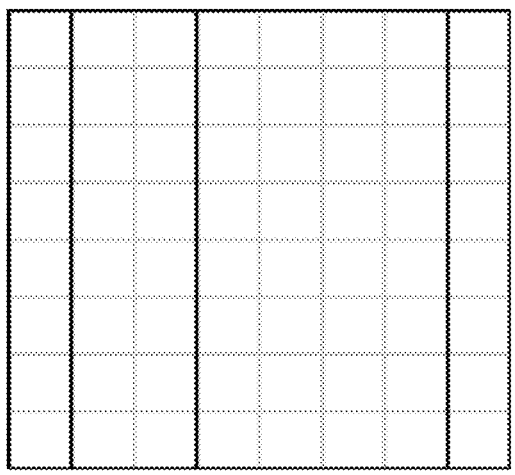
FIGS. 13A-13B illustrate an embodiment of a non-uniform quad split partition type.
Figure 13B:
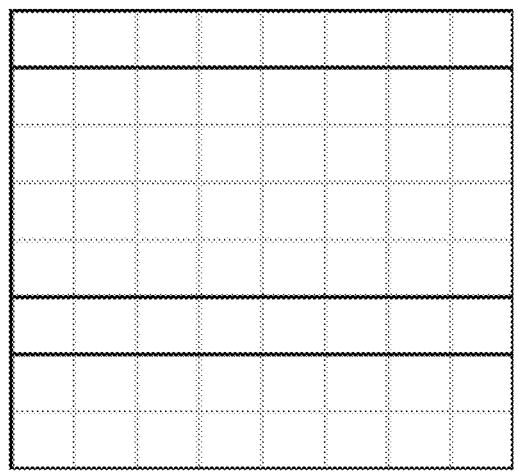

According to some embodiments, a non-uniform quad-split partition type includes splitting a block into four sub-blocks along a same direction. A non-uniform quad-split may be performed on a CU, PU, or TU. The ratio of the sub-blocks after the non-uniform quad split is performed may be 1:4:1:2. The non-uniform quad split may be applied along either the horizontal or vertical direction. FIGS. 13A and 13B illustrate examples of a non-uniform quad split partition type with a vertical ratio of 1:2:4:1 and a horizontal ratio of 1:4:1:2, respectively According to some embodiments, when applying the non-uniform quad split partition type, the four sub-blocks may have the relative area ratio of 1, 1, 2, 4. There are a total of 12 possible combinations of the ratio: (i) 1:1:2:4, (ii) 1:1:4:2, (iii) 1:2:1:4, (iv) 1:2:4:1, (v) 1:4:1:2, (vi) 1:4:2:1, (vii) 2:1:1:4, (viii) 2:1:4:1, (ix) 2:4:1:1, (x) 4:1:1:2, (xi) 4:1:2:1, and (xii) 4:2:1:1. As an example, when applying a horizontal non-uniform quad split with a ratio of 1:2:4:1 on a 64×64 block, the sub-blocks have sizes of 64×8, 64×16, 64×32, and 64×8.

In one embodiment, all the 12 ratio combinations are allowed. Each combination may be represented by an index from 0 to 11. In other embodiments, restrictions are applied on the possible combination of ratios. In one embodiment, only 8 ratio combinations are permitted (e.g., 1:2:1:4, 1:2:4:1, 1:4:1:2, 1:4:2:1, 2:1:1:4, 2:1:4:1, 4:1:1:2, 4:1:2:1). Each of these restricted combinations may be represented by an index from 0 to 7. In another embodiment, only 4 ratio combinations are permitted (e.g., 1:2:4:1, 1:4:1:2, 1:4:2:1, 2:1:4:1). Each of these restricted combinations may be represented by an index from 0 to 3. In another embodiment, the permitted non-uniform quad split ratios may be arranged in any arbitrary order.

In some embodiments, the index number indicating which ratio is being applied is binarized using truncated unary coding. In another embodiment, the index number indicating which ratio is being applied is binarized using fixed length coding. In another embodiment, the index number indicating which ratio is being applied is binarized with truncated unary plus fixed length coding.

Figure 14:
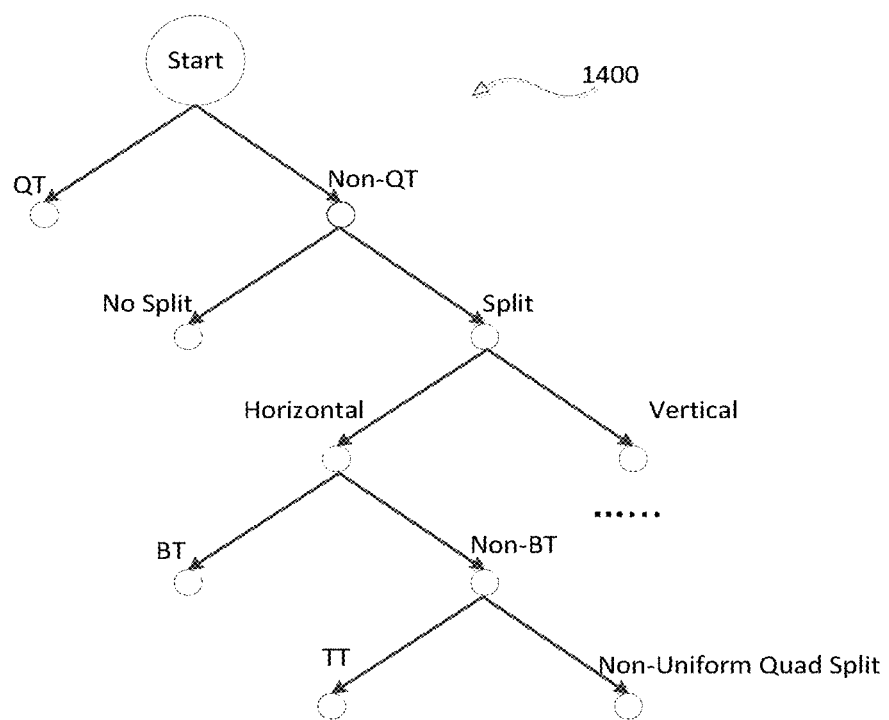
FIG. 14 illustrates an embodiment of a signaling tree.

According to some embodiments, when a non-QT split partition type is indicated, a binary value is conditionally signaled on top of the QT+BT-FTernary Tree (TT) structure to indicate whether the non-uniform quad split partition type is applied. In some embodiments, the binary value is a binary symbol that is to be compressed by the entropy encoder (525). The entropy encoder (525) may only take binary inputs, and thus, a non-binary symbol goes through a process called "binarization" to be converted to a series of bins (i.e., codeword, binary values). In one embodiment, after the horizontal/vertical direction has been indicated in signaling information that includes a signaling tree, a bin in the signaling tree indicates whether the partition type is BT or non-BT. When the bin indicates that the split partition type is non-BT, another bin may further indicate whether the partition type is TT or non-uniform quad split partition type. FIG. 14 illustrates an embodiment of a signaling tree (1400) without restriction (i.e., flags indicating a restriction type are signaled instead of inferred). The set of codewords for the tree (1400) may be in accordance with the following Table I if 8 of the 12 possible non-uniform quad split partition type combinations are used. The 8 combinations of the non-uniform quad split partition types may be binarized with fixed length coding.

TABLE I

| Partition Type | Codeword |
|---|---|
| Quad split (split to four same-size sub-blocks, all with half width and half height of the parent block) | 1 |
| Non-split | 00 |
| Horizontal binary split | 0100 |
| Horizontal ternary split | 01010 |
| Horizontal non-uniform quad split 1:2:1:4 | 01011000 |
| Horizontal non-uniform quad split 1:2:4:1 | 01011001 |
| Horizontal non-uniform quad split 1:4:1:2 | 01011010 |
| Horizontal non-uniform quad split 1:4:2:1 | 01011011 |
| Horizontal non-uniform quad split 2:1:1:4 | 01011100 |
| Horizontal non-uniform quad split 2:1:4:1 | 01011101 |
| Horizontal non-uniform quad split 4:1:1:2 | 01011110 |
| Horizontal non-uniform quad split 4:1:2:1 | 01011111 |
| Vertical binary split | 0110 |
| Vertical ternary split | 01110 |
| Vertical non-uniform quad split 1:2:1:4 | 01111000 |
| Vertical non-uniform quad split 1:2:4:1 | 01111001 |
| Vertical non-uniform quad split 1:4:1:2 | 01111010 |
| Vertical non-uniform quad split 1:4:2:1 | 01111011 |
| Vertical non-uniform quad split 2:1:1:4 | 01111100 |
| Vertical non-uniform quad split 2:1:4:1 | 01111101 |
| Vertical non-uniform quad split 4:1:1:2 | 01111110 |
| Vertical non-uniform quad split 4:1:2:1 | 01111111 |

As illustrated in Table I, each codeword uniquely identifies a particular partition type. For example, if a block has a codeword 01011000, then the block is partitioned in accordance with a horizontal non-uniform quad split partition type with the 4 sub-blocks having a ratio of 1:2:1:4. Table II illustrates another example set of codewords for the tree (1400) if 4 of the 12 possible combinations of non-uniform quad split partition types are used. The 4 combinations of the non-uniform quad split partition types may be binarized with fixed length coding.

TABLE II

| | |
|---|---|
| Quad split (split to four same-size sub-blocks, all with half width and half height) | 1 |
| Non-split | 00 |
| Horizontal binary split | 0100 |
| Horizontal ternary split | 01010 |
| Horizontal non-uniform quad split 1:2:4:1 | 0101100 |
| Horizontal non-uniform quad split 1:4:1:2 | 0101101 |
| Horizontal non-uniform quad split 1:4:2:1 | 0101110 |
| Horizontal non-uniform quad split 2:1:4:1 | 0101111 |
| Vertical binary split | 0110 |
| Vertical ternary split | 01110 |
| Vertical non-uniform quad split 1:2:4:1 | 0111100 |
| Vertical non-uniform quad split 1:4:1:2 | 0111101 |
| Vertical non-uniform quad split 1:4:2:1 | 0111110 |
| Vertical non-uniform quad split 2:1:4:1 | 0111111 |

According to some embodiments, the signaling tree (1400) is included as signaling information in a coded video bitstream. Determining a partition type of a block using the signaling tree (1400) may be performed as follows. The root of the signaling tree is the Start node, where it is determined if a block is split in accordance with the quad tree split partition type (FIG. 12B) (e.g., "QT" node). If the block is not split in accordance with the quad tree split partition type, then at the "Non-QT" node, it is determined whether the block is split. If the block is not split, then the process ends at the "No Split" node, where there is no partition of the block (FIG. 12A). However, if the block is split, then at the "Split" node, it is determined whether the block is split in either the horizontal direction (i.e., "Horizontal" node) or the vertical direction (i.e., "Vertical" node). The leafs of the tree under the "Vertical" node are not displayed since these leafs are identical to the leafs under the "Horizontal" node. At the "Horizontal" node, it is determined whether the block is split in accordance with a binary tree split partition type (i.e., "BT" node, FIG. 12C), or a non-binary tree split partition type. If the block is split in accordance with a non-binary tree split partition type, then at the "Non-BT" node, it is determined whether the block is split in accordance with the ternary tree split partition type (i.e., "TT" node, FIG. 8B) or the non-uniform quad split partition type (i.e., "Non-Uniform Quad Split" node, FIG. 13B).

Figure 15:
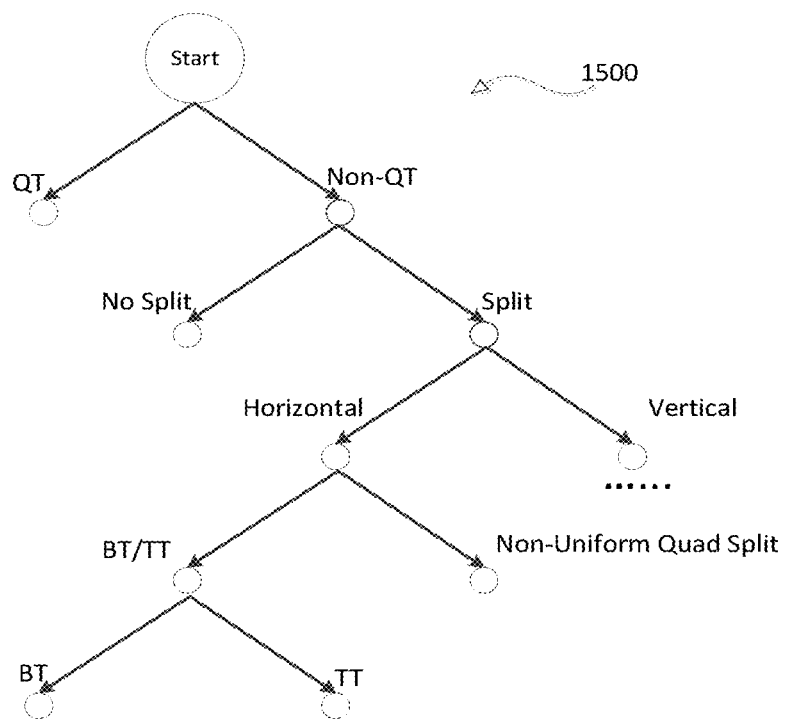
FIG. 15 illustrates an embodiment of a signaling tree.

FIG. 15 illustrates another embodiment of a signaling tree (1500). The tree (1500) is the same as tree (1400) from the root "Start" node to the "Horizontal" and "Vertical" nodes. However, at the "Horizontal" node, it is determined whether the block is split in accordance with the non-uniform quad split partition type (i.e., "Non-Uniform Quad Split" node, FIG. 13B). If the block is not split in accordance with the non-uniform quad split partition type, then at the "BT/TT" node, it is determined whether the block is partitioned in accordance with the binary tree split partition type (i.e., "BT" node, FIG. 12C) or the ternary tree split partition type (i.e., "TT" node, FIG. 8B).

According to some embodiments, restrictions of the CU shape and/or size may apply on the non-uniform quad split. In one embodiment, the non-uniform quad-split is applied on the block only when the number of pixels on the edge perpendicular to the split direction is greater than or equal to a predetermined value (e.g., 32). For example, a 64×8 block is allowed to be split into four sub-blocks with size of 8×8, 16×8, 32×8, and 8×8. In another example, a 16×16 block is not allowed to be split in accordance with the non-uniform quad split in either the horizontal or vertical direction.

In another embodiment, when a split of a block in accordance with the non-uniform quad split results in regions both inside and outside the picture boundary, the non-uniform quad split is allowed only when one of the sub-block boundaries along the split direction is also the picture boundary. For example, when a 64×8 block is at the picture boundary, with 40×8 inside the picture and 24×8 outside the picture, then the 1:2:4:1 split ratio is not allowed, but the 1:4:2:1 split ratio is allowed. When a non-uniform quad split is allowed at the picture boundary, the split may not be signaled but inferred.

Figure 16:
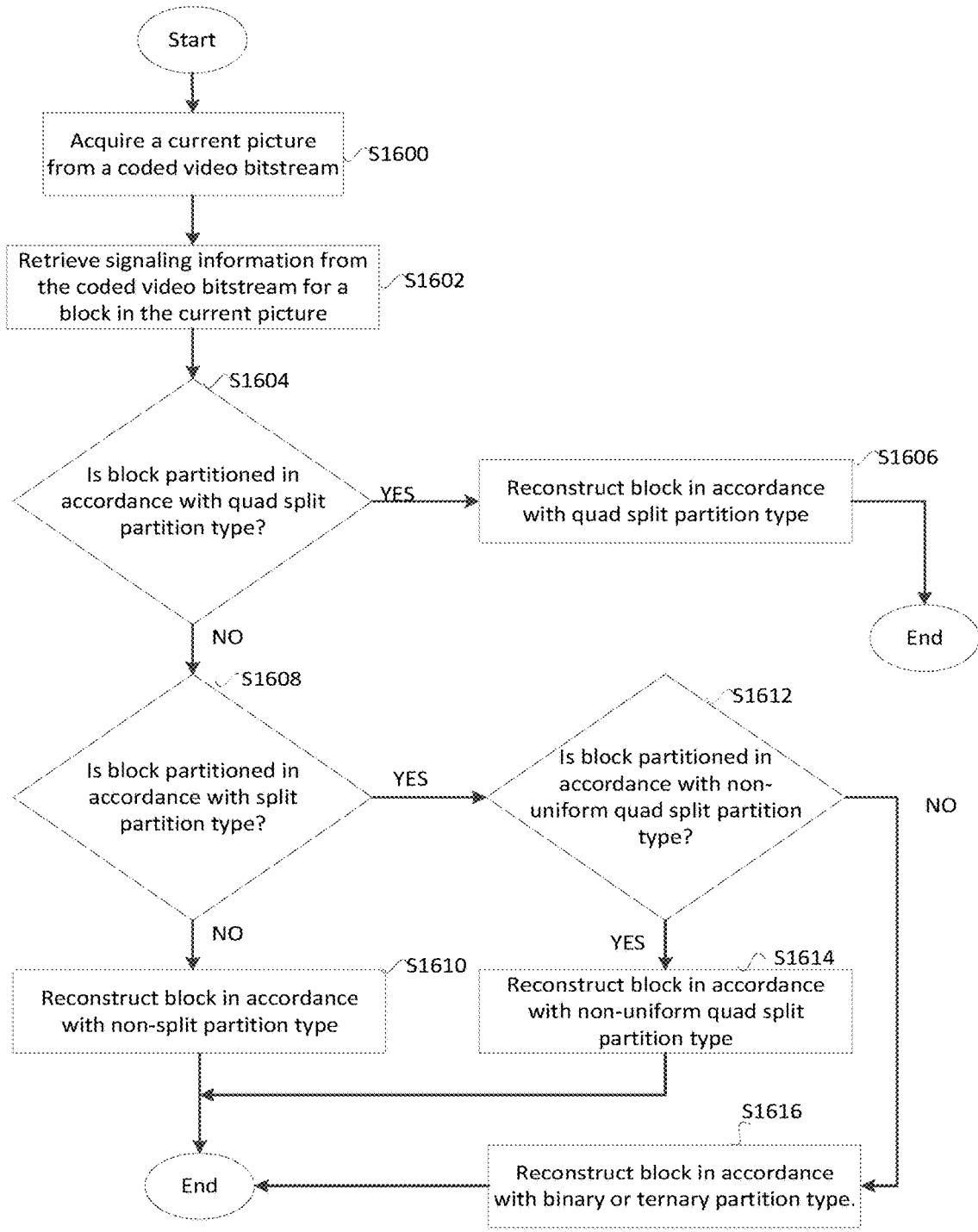
FIG. 16 illustrates an embodiment of a process performed by a decoder.

FIG. 16 illustrates an embodiment of a process performed by a decoder such as video decoder (610). The process may generally start at step (S1600) where a current picture is acquired from a coded video bitstream. The process proceeds to step (S1602) where signaling information is retrieved from the coded video bit stream for a block in the current picture. For example, the signaling information may include one of the signaling trees included in either FIG. 14 or 15.

The process proceeds to step (S1604) to determine whether the block is partitioned in accordance with a quad split partition type. If the block is partitioned in accordance with a quad split partition type, the process proceeds to step (S1606) where the block is reconstructed in accordance with the quad split partition type. FIG. 12B illustrates an example of a block that is partitioned in accordance with the quad split partition type. As illustrated in FIG. 12B, the block is partitioned into four equal sized sub-blocks.

Returning to step (S1604), if the block is not partitioned in accordance with the quad split partition type, the process proceeds to step (S1608) to determine whether the block is partitioned in accordance with the split partition type. If the block is not partitioned in accordance with the split partition type, the process proceeds to step (S1610) where the block is reconstructed in accordance with the non-split partition type. As an example, FIG. 12A illustrates a block that is not partitioned (i.e., non-split partition type).

Returning to step (S1608), if the block is partitioned in accordance with a split partition type, the process proceeds to step (S1612) to determine whether the block is partitioned in accordance with a non-uniform quad split partition type. If the block is partitioned in accordance with the non-uniform quad split partition type, the process proceeds to step (S1614) where the block is reconstructed in accordance with the non-uniform quad split partition type. FIGS. 13A and 13B illustrate examples of a block partitioned in accordance with the non-uniform split partition type. If the block is not partitioned in accordance with the non-uniform quad split partition type, the process proceeds to step (S1616) where the block is reconstructed in accordance with the binary or ternary split partition type. For example, referring to the signaling trees illustrated in FIGS. 14 and 15, after it is determined that a block is split, the block is split in accordance with either the non-uniform quad split partition type, the binary tree split partition type, and the ternary tree split partition type. Thus, if a block is not split according to the non-uniform quad split partition type, then the block is either split in accordance with the binary tree split partition type or the ternary tree split partition type. FIGS. 12C and 12D provide examples of the binary split partition type, and FIGS. 8A and 8B provide examples of the ternary tree split partition type. The process illustrated in FIG. 16 may be terminated after either one of steps (S1606), (S1610), (S1614), or (S1616) are performed.

The techniques described above, can be implemented as computer software using computer-readable instructions and physically stored in one or more computer-readable media. For example, FIG. 17 shows a computer system (1700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 17:
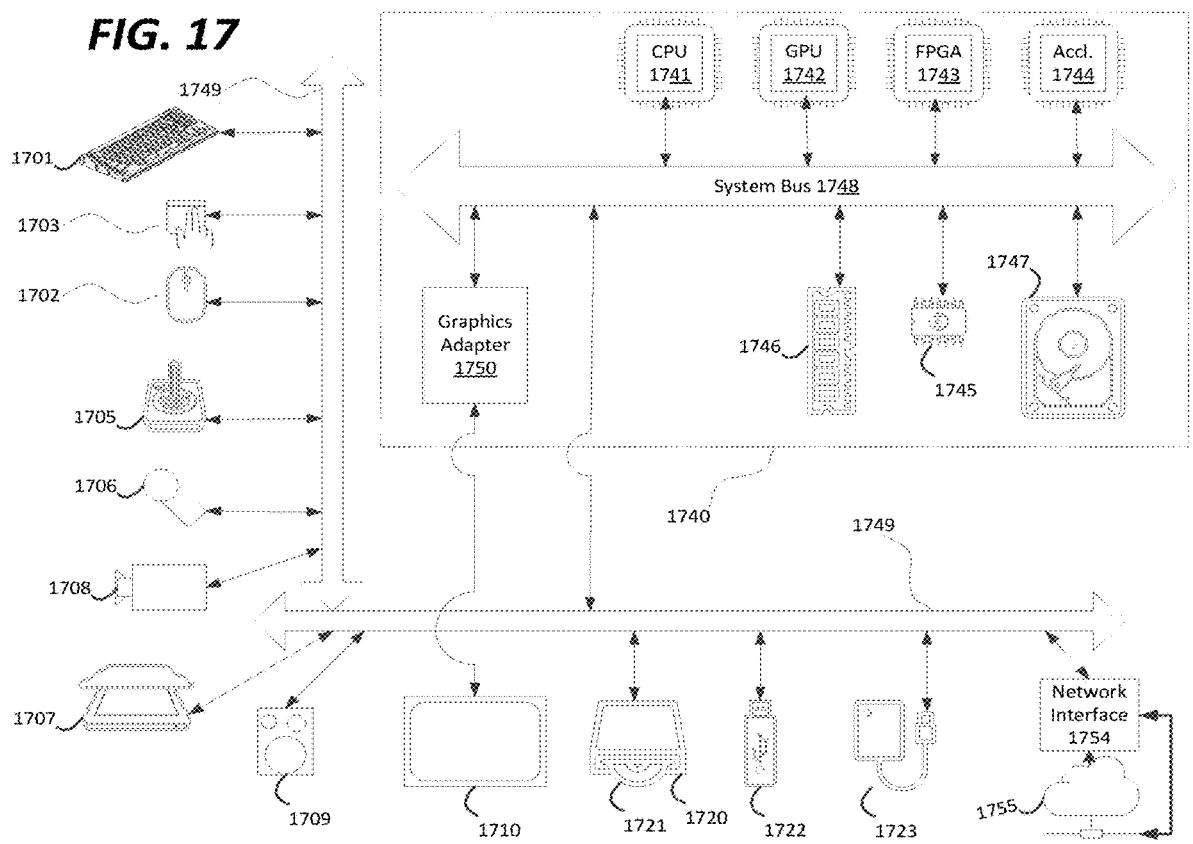
FIG. 17 is a schematic illustration of a computer system in accordance with an embodiment.

The components shown in FIG. 17 for computer system (1700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1700).

Computer system (1700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1701), mouse (1702), trackpad (1703), touch screen (1710), data-glove (not shown), joystick (1705), microphone (1706), scanner (1707), camera (1708).

Computer system (1700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1710), data-glove (not shown), or joystick (1705), but there can also be tactile feedback devices that do not serve as input devices), audio output devices (such as: speakers (1709), headphones (not depicted)), visual output devices (such as screens (1710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1700) can also include human accessible storage devices and their associated media such as optical media including CD/DVD ROM/RW (1720) with CD/DVD or the like media (1721), thumb-drive (1722), removable hard drive or solid state drive (1723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1700) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1749) (such as, for example USB ports of the computer system (1700)); others are commonly integrated into the core of the computer system (1700) by attachment to a system bus as described below (for example Ethernet interface into a PC computer system or cellular network interface into a smartphone computer system). Using any of these networks, computer system (1700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1740) of the computer system (1700).

The core (1740) can include one or more Central Processing Units (CPU) (1741), Graphics Processing Units (GPU) (1742), specialized programmable processing units in the form of Field Programmable Gate Areas (FPGA) (1743), hardware accelerators for certain tasks (1744), and so forth. These devices, along with Read-only memory (ROM) (1745), Random-access memory (1746), internal mass storage such as internal non-user accessible hard drives, SSDs, and the like (1747), may be connected through a system bus (1748). In some computer systems, the system bus (1748) can be accessible in the form of one or more physical plugs to enable extensions by additional CPUs, GPU, and the like. The peripheral devices can be attached either directly to the core's system bus (1748), or through a peripheral bus (1749). Architectures for a peripheral bus include PCI, USB, and the like.

CPUs (1741), GPUs (1742), FPGAs (1743), and accelerators (1744) can execute certain instructions that, in combination, can make up the aforementioned computer code. That computer code can be stored in ROM (1745) or RAM (1746). Transitional data may be also stored in RAM (1746), whereas permanent data can be stored for example, in the internal mass storage (1747). Fast storage and retrieve to any of the memory devices can be enabled through the use of cache memory, that can be closely associated with one or more CPU (1741), GPU (1742), mass storage (1747), ROM (1745), RAM (1746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1700), and specifically the core (1740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1740) that are of non-transitory nature, such as core-internal mass storage (1747) or ROM (1745). The software implementing various embodiments of the present disclosure can be stored in such devices and executed by core (1740). A computer-readable medium can include one or more memory devices or chips, according to particular needs. The software can cause the core (1740) and specifically the processors therein (including CPU, GPU, FPGA, and the like) to execute particular processes or particular parts of particular processes described herein, including defining data structures stored in RAM (1746) and modifying such data structures according to the processes defined by the software. In addition or as an alternative, the computer system can provide functionality as a result of logic hardwired or otherwise embodied in a circuit (for example: accelerator (1744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

(1) A method of video decoding for a decoder, the method including acquiring a current picture from a coded video bitstream; retrieving signaling information from the coded video bitstream for a block in the current picture; determining, from the signaling information, whether the block is partitioned in accordance with a quad split partition type; in response to determining that the block is not partitioned in accordance with the quad split partition type, determining whether the block is partitioned in accordance with a split partition type; in response to determining that the block is partitioned in accordance with the split partition type, determining whether the block is partitioned in accordance with a non-uniform quad split partition type in which the block is partitioned into four sub-blocks along a same direction; and in response to determining that the block is partitioned in accordance with the non-uniform quad split partition type, reconstructing the block in accordance with the non-uniform quad split partition type.

(2) The method of according to feature (1), in which the determining whether the block is partitioned in accordance with the non-uniform quad split partition type further includes: determining whether the block is partitioned in accordance with one of (i) a binary split partition type in which the block is partitioned into two sub-blocks along a same direction and (ii) a non-binary split partition type, and in response to determining that the block is partitioned in accordance with the non-binary split partition type, determining whether the block is partitioned in accordance with one of (i) a ternary split partition type in which the block is partitioned into three sub-blocks along a same direction and (ii) the non-uniform quad split partition type.

(3) The method according to feature (1) or (2), in which the determining whether the block is partitioned in accordance with the non-uniform quad split further includes: determining whether the block is partitioned in accordance with one of (i) a non-quad split partition type, and (ii) the non-uniform quad split partition type.

(4) The method of according to feature (3), in which in response to determining that the block is partitioned in accordance with the non-quad partition type, determining whether the block is partitioned in accordance with one of (i) a binary split partition type in which the block is partitioned into two sub-blocks along a same direction and (ii) a ternary split partition type in which the block is partitioned into three sub-blocks along a same direction.

(5) The method of according to feature (1), in which the block partitioned in accordance with the non-uniform quad partition split type includes first and second sub-blocks of a same fixed size, a third sub-block that is twice the fixed size, and fourth sub-block that is four times the fixed size.

(6) The method according to feature (5), in which the first and second sub-blocks are adjacent to each other.

(7) The method according to feature (5), in which the first and second blocks are not adjacent to each other.

(8) The method according to feature (5), in which the first sub-block is between the third sub-block and the fourth sub-block.

(9) The method according to any one of features (1)-(8), in which the determining whether the block is partitioned in accordance with the non-uniform quad split partition type further includes: determining a size of the block along an edge perpendicular to a direction in which the block is partitioned, and in response to determining that the size of the block along the edge perpendicular to the direction in which the block is partitioned is greater than equal to 32 samples, determining that the block is partitioned in accordance with the non-uniform quad split partition type.

(10) The method according to any one of features (1)-(9), in which the determining whether the block is partitioned in accordance with the non-uniform quad split partition type further includes: in response to determining that a partition of the block in accordance with the non-uniform quad split partition type results in at least one sub-block being outside of a picture boundary of the current picture, determining that the block is not partitioned in accordance with the non-uniform quad split partition type.

(11) A video decoder for video decoding including processing circuitry configured to: acquire a current picture from a coded video bitstream, retrieve signaling information from the coded video bitstream for a block in the current picture, determine, from the signaling information, whether the block is partitioned in accordance with a quad split partition type, in response to the determination that the block is not partitioned in accordance with the quad split partition type, determine whether the block is partitioned in accordance with a split partition type, in response to the determination that the block is partitioned in accordance with the split partition type, determine whether the block is partitioned in accordance with a non-uniform quad split partition type in which the block is partitioned into four sub-blocks along a same direction, and in response to the determination that the block is partitioned in accordance with the non-uniform quad split partition type, reconstruct the block in accordance with the non-uniform quad split partition type.

(12) The video decoder according to feature (11), in which the determination whether the block is partitioned in accordance with the non-uniform quad split partition type further includes the processing circuitry configured to: determine whether the block is partitioned in accordance with one of (i) a binary split partition type in which the block is partitioned into two sub-blocks along a same direction and (ii) a non-binary split partition type, and in response to the determination that the block is partitioned in accordance with the non-binary split partition type, determine whether the block is partitioned in accordance with one of (i) a ternary split partition type in which the block is partitioned into three sub-blocks along a same direction and (ii) the non-uniform quad split partition type.

(13) The video decoder according to feature (11) or (12), in which the determination whether the block is partitioned in accordance with the non-uniform quad split further includes the processing circuitry configured to: determine whether the block is partitioned in accordance with one of (i) a non-quad split partition type, and (ii) the non-uniform quad split partition type.

(14) The video decoder according to any one of features (11)-(13), in which response to the determination that the block is partitioned in accordance with the non-quad partition type, the processing circuitry is further configured to determine whether the block is partitioned in accordance with one of (i) a binary split partition type in which the block is partitioned into two sub-blocks along a same direction and (ii) a ternary split partition type in which the block is partitioned into three sub-blocks along a same direction.

(15) The video decoder according to any one of features (11)-(14), in which the block partitioned in accordance with the non-uniform quad partition split type includes first and second sub-blocks of a same fixed size, a third sub-block that is twice the fixed size, and fourth sub-block that is four times the fixed size.

(16) The video decoder according to feature (15), in which the first and second sub-blocks are adjacent to each other.

(17) The video decoder according to feature (15), in which the first and second blocks are not adjacent to each other.

(18) The video decoder according to any one of features (11)-(17), in which the determination whether the block is partitioned in accordance with the non-uniform quad split partition type further includes the processing circuitry configured to: determine a size of the block along an edge perpendicular to a direction in which the block is partitioned, and in response to the determination that the size of the block along the edge perpendicular to the direction in which the block is partitioned is greater than equal to 32 samples, determine that the block is partitioned in accordance with the non-uniform quad split partition type.

(19) The video decoder according to any one of features (11)-(18), wherein the determination whether the block is partitioned in accordance with the non-uniform quad split partition type further includes the processing circuitry further configured to: in response to the determination that a partition of the block in accordance with the non-uniform quad split partition type results in at least one sub-block being outside of a picture boundary of the current picture, determine that the block is not partitioned in accordance with the non-uniform quad split partition type.

(20) A non-transitory computer readable medium having instructions stored therein, which when executed by a processor in a decoder causes the processor to executed a method including acquiring a current picture from a coded video bitstream; retrieving signaling information from the coded video bitstream for a block in the current picture; determining, from the signaling information, whether the block is partitioned in accordance with a quad split partition type; in response to determining that the block is not partitioned in accordance with the quad split partition type, determining whether the block is partitioned in accordance with a split partition type; in response to determining that the block is partitioned in accordance with the split partition type, determining whether the block is partitioned in accordance with a non-uniform quad split partition type in which the block is partitioned into four sub-blocks along a same direction; and in response to determining that the block is partitioned in accordance with the non-uniform quad split partition type, reconstructing the block in accordance with the non-uniform quad split partition type.

The invention claimed is:

1. A method of video decoding for a decoder, the method comprising:
   acquiring a current picture from a coded video bitstream;
   retrieving signaling information from the coded video bitstream for a block in the current picture;
   determining, from the signaling information, whether the block is partitioned in accordance with a quad split partition type;
   in response to determining that the block is not partitioned in accordance with the quad split partition type, determining whether the block is partitioned in accordance with a split partition type;
   in response to determining that the block is partitioned in accordance with the split partition type, determining whether the block is partitioned in accordance with a non-uniform quad split partition type of a plurality of non-uniform partition types in which the block consists of four sub-blocks along a same direction; and
   in response to determining that the block is partitioned in accordance with the non-uniform quad split partition type, reconstructing the block in accordance with the non-uniform quad split partition type of the plurality of non-uniform partition types,
   wherein the block partitioned in accordance with the non-uniform quad partition split type includes first and second sub-blocks of a same fixed size, a third sub-block that is twice the fixed size, and a fourth sub-block that is four times the fixed size.

2. The method of according to claim 1, wherein the determining whether the block is partitioned in accordance with the non-uniform quad split partition type further includes:
   determining whether the block is partitioned in accordance with one of (i) a binary split partition type in which the block is partitioned into two sub-blocks along a same direction and (ii) a non-binary split partition type, and
   in response to determining that the block is partitioned in accordance with the non-binary split partition type, determining whether the block is partitioned in accordance with one of (i) a ternary split partition type in which the block is partitioned into three sub-blocks along a same direction and (ii) the non-uniform quad split partition type.

3. The method according to claim 1, wherein the determining whether the block is partitioned in accordance with the non-uniform quad split further includes:
   determining whether the block is partitioned in accordance with (i) a non-quad split partition type, and (ii) the non-uniform quad split partition type.

4. The method of according to claim 3, wherein in response to determining that the block is partitioned in accordance with the non-quad partition type, determining whether the block is partitioned in accordance with one of (i) a binary split partition type in which the block is partitioned into two sub-blocks along a same direction and (ii) a ternary split partition type in which the block is partitioned into three sub-blocks along a same direction.

5. The method according to claim 1, wherein the first and second sub-blocks are adjacent to each other.

6. The method according to claim 1, wherein the first and second sub-blocks are not adjacent to each other.

7. The method according to claim 1, wherein the first sub-block is between the third sub-block and the fourth sub-block.

8. The method according to claim 1, wherein the determining whether the block is partitioned in accordance with the non-uniform quad split partition type further includes:
   determining a size of the block along an edge perpendicular to a direction in which the block is partitioned, and
   in response to determining that the size of the block along the edge perpendicular to the direction in which the block is partitioned is greater than equal to 32 samples, determining that the block is partitioned in accordance with the non-uniform quad split partition type.

9. The method according to claim 1, wherein the determining whether the block is partitioned in accordance with the non-uniform quad split partition type further includes:
in response to determining that a partition of the block in accordance with the non-uniform quad split partition type results in at least one sub-block being outside of a picture boundary of the current picture, determining that the block is not partitioned in accordance with the non-uniform quad split partition type.

10. A video decoder for video decoding, comprising:
processing circuitry to:
acquire a current picture from a coded video bitstream,
retrieve signaling information from the coded video bitstream for a block in the current picture,
determine, from the signaling information, whether the block is partitioned in accordance with a quad split partition type,
in response to the determination that the block is not partitioned in accordance with the quad split partition type, determine whether the block is partitioned in accordance with a split partition type,
in response to the determination that the block is partitioned in accordance with the split partition type, determine whether the block is partitioned in accordance with a non-uniform quad split partition type of a plurality of non-uniform partition types in which the block consists of four sub-blocks along a same direction, and
in response to the determination that the block is partitioned in accordance with the non-uniform quad split partition type, reconstruct the block in accordance with the non-uniform quad split partition type of the plurality of non-uniform partition types,
wherein the block partitioned in accordance with the non-uniform quad partition split type includes first and second sub-blocks of a same fixed size, a third sub-block that is twice the fixed size, and a fourth sub-block that is four times the fixed size.

11. The video decoder according to claim 10, wherein the determination whether the block is partitioned in accordance with the non-uniform quad split partition type further includes the processing circuitry configured to:
determine whether the block is partitioned in accordance with one of (i) a binary split partition type in which the block is partitioned into two sub-blocks along a same direction and (ii) a non-binary split partition type, and
in response to the determination that the block is partitioned in accordance with the non-binary split partition type, determine whether the block is partitioned in accordance with one of (i) a ternary split partition type in which the block is partitioned into three sub-blocks along a same direction and (ii) the non-uniform quad split partition type.

12. The video decoder according to claim 10, wherein the determination whether the block is partitioned in accordance with the non-uniform quad split further includes the processing circuitry configured to:
determine whether the block is partitioned in accordance with (i) a non-quad split partition type, and (ii) the non-uniform quad split partition type.

13. The video decoder according to claim 12, wherein in response to the determination that the block is partitioned in accordance with the non-quad partition type, the processing circuitry is further configured to determine whether the block is partitioned in accordance with one of (i) a binary split partition type in which the block is partitioned into two sub-blocks along a same direction and (ii) a ternary split partition type in which the block is partitioned into three sub-blocks along a same direction.

14. The video decoder according to claim 10, wherein the first and second sub-blocks are adjacent to each other.

15. The video decoder according to claim 10, wherein the first and second sub-blocks are not adjacent to each other.

16. The video decoder according to claim 10, wherein the determination whether the block is partitioned in accordance with the non-uniform quad split partition type further includes the processing circuitry configured to:
determine a size of the block along an edge perpendicular to a direction in which the block is partitioned, and
in response to the determination that the size of the block along the edge perpendicular to the direction in which the block is partitioned is greater than equal to 32 samples, determine that the block is partitioned in accordance with the non-uniform quad split partition type.

17. The video decoder according to claim 10, wherein the determination whether the block is partitioned in accordance with the non-uniform quad split partition type further includes the processing circuitry further configured to:
in response to the determination that a partition of the block in accordance with the non-uniform quad split partition type results in at least one sub-block being outside of a picture boundary of the current picture, determine that the block is not partitioned in accordance with the non-uniform quad split partition type.

18. A non-transitory computer readable medium having instructions stored therein, which when executed by a processor in a decoder causes the processor to execute a method comprising:
acquiring a current picture from a coded video bitstream;
retrieving signaling information from the coded video bitstream for a block in the current picture;
determining, from the signaling information, whether the block is partitioned in accordance with a quad split partition type;
in response to determining that the block is not partitioned in accordance with the quad split partition type, determining whether the block is partitioned in accordance with a split partition type;
in response to determining that the block is partitioned in accordance with the split partition type, determining whether the block is partitioned in accordance with a non-uniform quad split partition type of a plurality of non-uniform partition types in which the block consists of four sub-blocks along a same direction; and
in response to determining that the block is partitioned in accordance with the non-uniform quad split partition type, reconstructing the block in accordance with the non-uniform quad split partition type of the plurality of non-uniform partition types,
wherein the block partitioned in accordance with the non-uniform quad partition split type includes first and second sub-blocks of a same fixed size, a third sub-block that is twice the fixed size, and a fourth sub-block that is four times the fixed size.

* * * * *